(12) United States Patent
Yocom et al.

(10) Patent No.: US 6,544,438 B2
(45) Date of Patent: Apr. 8, 2003

(54) PREPARATION OF HIGH EMISSION EFFICIENCY ALKALINE EARTH METAL THIOGALLATE PHOSPHORS

(75) Inventors: Perry Niel Yocom, Princeton, NJ (US); Diane Zaremba, Fairless Hills, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/860,018

(22) Filed: May 17, 2001

(65) Prior Publication Data

US 2002/0014614 A1 Feb. 7, 2002

Related U.S. Application Data

(60) Provisional application No. 60/222,678, filed on Aug. 2, 2000.

(51) Int. Cl.$^7$ ................................................ C09K 11/00
(52) U.S. Cl. .................................................. 252/301.45
(58) Field of Search .................................... 252/301.45

(56) References Cited

U.S. PATENT DOCUMENTS

| | | | |
|---|---|---|---|
| 3,623,996 A | 11/1971 | Amster | 252/301.4 S |
| 3,639,254 A | 2/1972 | Peters | 252/301.4 S |

OTHER PUBLICATIONS

Peters et al, Luminescence and Structural Properties of Thiogallate Phosphors: J. Electrochem. Soc. vol. 119, 1972, p230.

*Primary Examiner*—Elizabeth D. Wood
(74) *Attorney, Agent, or Firm*—William J. Burke

(57) ABSTRACT

A method of forming high efficiency emission alkali metal activated gallium sulfide phosphors by including an excess of 1–7% of gallium. A solution of a soluble gallium salt is added to a sulfate precipitate of an alkali metal sulfate and firing in hydrogen sulfide atmosphere at temperatures up to about 900° C.

15 Claims, No Drawings

PREPARATION OF HIGH EMISSION EFFICIENCY ALKALINE EARTH METAL THIOGALLATE PHOSPHORS

This application claims priority from Provisional application Serial No. 60/222,678 filed Aug. 2, 2000.

This invention relates to a method of preparing high emission efficiency thiogallate phosphors. More particularly, this invention relates to a method of preparing high emission efficiency alkaline earth metal thiogallate phosphors activated with europium.

BACKGROUND OF THE INVENTION

Alkaline earth metal thiogallate phosphors ($MGa_2S4$) activated with divalent europium, praseodymium, trivalent cerium and mixtures thereof, have been disclosed by Peters et al, J. Electrochem. Soc., Vol. 119, 1972, p230. These phosphors were made by solid state reaction from the alkaline earth sulfide, gallium sulfide and rare earth sulfides. They emit in the green to yellow region of the spectrum. They have good saturation properties, but their emission efficiency is low, at about 30% that of other sulfide phosphors. However, high efficiency phosphors are required for field emission displays, projection television, and blue-violet diode laser light sources.

Thus a method of preparing the above phosphors that results in an improvement of their emission efficiency would be highly desirable.

SUMMARY OF THE INVENTION

We have found that activated alkaline earth metal thiogallate phosphors having improved emission efficiency can be made by intimately mixing their insoluble sulfate salt precursors having a small particle size with gallium nitrate solution, in amounts to produce a small excess of gallium. The soluble salts are precipitated with sulfuric acid or ammonium sulfate to form their corresponding insoluble sulfates. These solids are then fired in hydrogen sulfide to form the corresponding thiogallate sulfide phosphors.

DETAILED DESCRIPTION OF THE INVENTION

The present method includes the following steps.

A soluble alkali metal salt, as of strontium or calcium nitrate, is dissolved in dilute nitric acid. The desired amount of europium activator (1–6 mol percent) is added as a soluble salt, such as its nitrate. Neutralization with ammonium hydroxide produces a suspension of alkali metal sulfate particles coated with europium hydroxide.

The following equation summarizes this step:

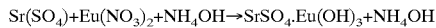

Sulfuric acid or ammonium sulfate is added to precipitate the corresponding insoluble alkali metal sulfate. The particle size of the resultant precipitate should be kept small. This can be done by controlling the temperature and concentration of the soluble salt solution and by diluting the solution with an organic, miscible solvent, such as an alcohol.

A solution of an acid-soluble gallium salt, such as the nitrate, is also made. This can be done by dissolving the metal in nitric acid overnight. Since gallium oxide is very difficult to convert to an oxide-free sulfide with hydrogen sulfide, the oxide starting material is not recommended.

The gallium nitrate is added to the europium hydroxide coated alkaline earth sulfate in sufficient amount so as to produce an excess of from about 0.1–7 percent by weight of gallium in the final gallium sulfide product. The phosphor precursor is shown below, where "2.01" indicates a slight excess of the gallium hydroxide, as

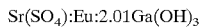

After combining these solutions and bringing the mixture to a neutral pH with ammonia, or by carrying out a precipitation of gallium using urea, a solid precipitates. The solid phosphor precursor is dried, ground, placed in a refractory boat, such as an alumina boat, and fired in hydrogen sulfide for about five hours in a tube furnace. Suitably the firing temperature is about 800° C. The sulfide product obtained is shown below:

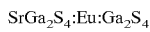

To ensure uniformity of the product, the sulfide material is ground to a powder and refired in hydrogen sulfide at 900° C. for about two hours. The resultant strontium thiogallate phosphor has a particle size of about 8–10 microns. Its emission efficiency was measured at 80–100 percent.

The resultant green emitting, high emission efficiency phosphor should show a slight excess of gallium sulfide by means of x-ray analysis, in the range of about 0.5–7%.

If an organic solvent, such as an alcohol or acetone is added when the sulfate is precipitated, and firing is carried out at a lower temperature, such as 780° C. for five hours and 850° C. for about four hours, the average particle size of the product will be somewhat smaller, e.g., about 5–6 microns. Thus the product particle size can be controlled as required by the final use of the phosphor.

A like calcium gallium sulfide activated with Eu can be made in similar manner but substituting a calcium salt for the strontium salt. A mixed crystal phosphor of strontium and calcium can also be made. Cerium or praseodymium can be substituted, in whole or in part, for the europium activator.

Reducing the amount of gallium present (for example a 5 to 3% excess) reduces the particle size and sometimes the relative efficiency of the $SrGa_2S_4$ phosphor.

For example, samples with a 5% excess gallium, fired at 900° C. for two hours can have a relative efficiency range of from about 66 to 100%, with a median particle size of about 8.59 to 9.41 microns.

A sample with 3% excess gallium, plus the addition of alcohol in the precipitation step and fired at 850° C. for four hours, can have a relative efficiency of about 82% and a median particle size of about 3.63 microns.

The invention will be further described by means of the following examples. However, the invention is not meant to be limited to the details described therein.

In the Examples, all parts are by weight.

EXAMPLE 1

A solution of gallium nitrate was prepared as follows: 57.45 parts of gallium were dissolved in 400 ml conc. nitric acid. The mixture was heated until brown fumes appeared, when the heat was removed and the container covered. After standing overnight, the resultant green solution was alternately heated and cooled until it turned yellow, and then clear. Deionized water was added to form 1000 ml of solution.

Ammonium hydroxide (about 80 ml) was added slowly to obtain a solution pH of about 2. Water was added to make up 1200 ml of the solution.

Europium oxide (2.815 parts) was solubilized in 400 ml of dilute nitric acid. Strontium carbonate was added slowly, adding more nitric acid if needed. 1.2 ml of a 0.01 M solution of praseodymium oxide was also added, and water was added to make up 600 ml of solution.

Ammonium sulfate (120 parts) was dissolved in 540 ml of water to make up 600 ml of solution.

The ammonium sulfate solution was added with stirring to the strontium-europium-praseodymium nitrate solution. The mixture was stirred for ten minutes, and acidified to a pH of about 1.4. The gallium nitrate solution was added, and the pH raised to 7 with ammonium hydroxide. The mixture was stirred for two hours and allowed to stand overnight.

The supernatant solution was decanted and filtered and the precipitate washed with acetone. The precipitate was re-suspended in 2500 ml of acetone, stirring for 1 hour at 50° C., and then filtered. The re-suspension step was repeated, and the precipitate dried overnight at 55° C.

The precipitate was ground in a ball mill with 140 alumina balls ½"×7/16" in size in acetone and dried overnight. 182 Grams of material were obtained.

The ground precipitate was heated at a rate of 20° C./min to 800° C. in hydrogen sulfide and held for five hours. The resulting green phosphor was re-ground and fired again, this time at 900° C. in hydrogen sulfide for two hours. The average particle size was about 8–10 microns. A yield of 120 grams was obtained.

The green-emitting phosphor had a relative efficiency of 100%.

EXAMPLE 2

57.45 Parts of gallium was warmed until it liquified and was dissolved in 400 parts by volume of nitric acid. When brown fumes were seen, it was removed from the heat, covered and let set overnight. A green solution was obtained which was warmed and cooled until it turned yellow, and finally clear. Deionized water was added to make a one liter solution. Ammonium hydroxide (about 80 ml) was added to a pH of about 2, and water added to make up 1200 ml of solution.

Europium oxide was dissolved in 400 ml of dilute nitric acid. Strontium carbonate was added slowly, and then 1.2 ml of 0.01M praseodymium solution was added. Water was added to make up 600 ml of solution. The pH should be about 0.02 to 0.2 and was adjusted as required.

500 Ml of ethanol was added slowly.

50 Ml of sulfuric acid was diluted with 300 ml of deionized water. The dilute sulfuric acid was added to the strontium-europium-praeseodymium solution and stirred for 10 minutes. The pH was adjusted as required to be about the same as the gallium solution. The gallium solution was added. The pH was adjusted to 7, and ethyl alcohol was added to make up 3.5 liters. The mixture was stirred for two hours, let set overnight and filtered. The precipitate was washed with acetone.

The precipitate was re-suspended in 3500 ml of acetone by stirring for one hour at 50° C. The solids were filtered and dried overnight at 55° C.

The solids were then ground and ball milled in 2500 ml of acetone including 140 alumina balls. The solids were filtered and dried overnight at 55°.

The precipitate was fired at 780° C. for five hours, and then at 850° C. for four hours. The average particle size was smaller than that of Example 1, i.e., about 5–6 microns. Thus the phosphor was somewhat less efficient, about 82%, but had a smaller median particle size of about 4 microns.

Although the invention has been described in terms of particular embodiments, one skilled in the art will well know how to change the ingredients and their relative amounts. Thus the invention is only meant to be limited to the details described in the following claims.

We claim:

1. A method of making a high emission efficiency alkali metal thiogallate phosphor comprising intimately mixing an alkali metal sulfate having a particle size below about 10 microns coated with an activator with gallium nitrate solution in an amount such that an excess of gallium is present in the final phosphor product, precipitating the activated alkali metal gallium sulfate, and firing in the presence of hydrogen sulfide.

2. A method according to claim 1 wherein an excess of 1 to 7% by weight of gallium is present in the phosphor.

3. A method of making high emission efficiency thiogallate phosphors comprising a) forming an aqueous solution of a soluble alkali metal salt;

b) adding a sulfate to precipitate an alkali metal sulfate;

c) re-suspending the sulfate in water;

d) adding 2–5 mol % of the sulfate of a soluble activator salt, e) precipitating the activator sale onto the alkali metal sulfate;

f) adding an excess of from about 0.1–7 percent by weight of a solution of a soluble gallium salt to the precipitate, g) neutralizing the solution to form a precipitate, and h) firing the precipitate in hydrogen sulfide to form the corresponding sulfide phosphor.

4. A method according to claim 3 wherein the alkali metal is selected from the group consisting of strontium, calcium and mixtures thereof.

5. A method according to claim 4 wherein the soluble salt is a nitrate.

6. A method according to claim 3 wherein the activator is europium and praseodymium.

7. A method according to claim 3 wherein step h) is carried out by heating at 800° C. and then at 850° C.

8. A method according to claim 3 wherein step h) is carried out by heating at 800° C. and then at 900° C.

9. A method according to claim 3 wherein an organic solvent is added to the sulfate solution of step f) prior to firing.

10. A high emission efficiency rare earth activated alkaline earth metal (M) thiogallate phosphor comprising

wherein M is an alkaline earth metal wherein an excess of gallium of from 0.1 to 7 percent by weight with respect to the alkaline earth metal is present.

11. A phospor according to claim 10 wherein M is selected from the group consisting of strontium and calcium and mixtures thereof.

12. A phosphor according to claim 10 wherein said rare earth is selected from one or more of the group consisting of europium, cerium and praeseodymium.

13. An activated alkaline earth metal thiogallate phosphor having an excess of gallium of from 0.1 to 7 percent by weight of the alkaline earth metal.

14. A thiogallage phosphor according to claim 13 wherein said alkaline earth is strontium.

15. A thiogallage phosphor according to claim 13 wherein said alkaline earth is calcium.

* * * * *

UNITED STATES PATENT AND TRADEMARK OFFICE
CERTIFICATE OF CORRECTION

PATENT NO. : 6,544,438 B2
DATED : April 8, 2003
INVENTOR(S) : Perry Niel Yocom and Diane Zaremba It is certified that error appears in the above-identified patent and that said Letters Patent is hereby corrected as shown below:

<u>Column 2,</u>
Line 15, the formula should read:
-- $SrGa_2S_4:Eu:Ga_2S_3$ --

Signed and Sealed this

Thirty-first Day of August, 2004

JON W. DUDAS
*Director of the United States Patent and Trademark Office*